April 7, 1925.  1,532,986

V. L. BRANSON

HARROW ATTACHMENT FOR CULTIVATORS

Filed March 26, 1923   2 Sheets-Sheet 1

Inventor
Verne L. Branson

By Lamaster and Allorine
Attorney

April 7, 1925.  
V. L. BRANSON  
1,532,986  
HARROW ATTACHMENT FOR CULTIVATORS  
Filed March 26, 1923   2 Sheets-Sheet 2

Verne L. Branson.

Patented Apr. 7, 1925.

1,532,986

UNITED STATES PATENT OFFICE.

VERNE L. BRANSON, OF LEXINGTON, NEBRASKA.

HARROW ATTACHMENT FOR CULTIVATORS.

Application filed March 26, 1923. Serial No. 627,800.

*To all whom it may concern:*

Be it known that I, VERNE L. BRANSON, a citizen of the United States, residing at Lexington, in the county of Dawson and State of Nebraska, have invented certain new and useful Improvements in a Harrow Attachment for Cultivators, of which the following is a specification.

This invention relates to improvements in harrow attachments for cultivators.

The primary object of this invention is the provision of a novel arrangement of earth working teeth or members for harrows.

A further object of this invention is the provision of a harrow attachment embodying cooperating plowing and harrowing members so arranged that the same may be most effectively used together for weeding and earth working without liability of injury to the plants being cultivated.

A further object of this invention is the provision of a novel tooth construction for harrows.

Other objects and advantages of this invention will be apparent during the course of the following detailed description.

In the accompanying drawings, forming a part of this specification, and wherein similar reference characters designate corresponding parts throughout the several views.

Figure 1:
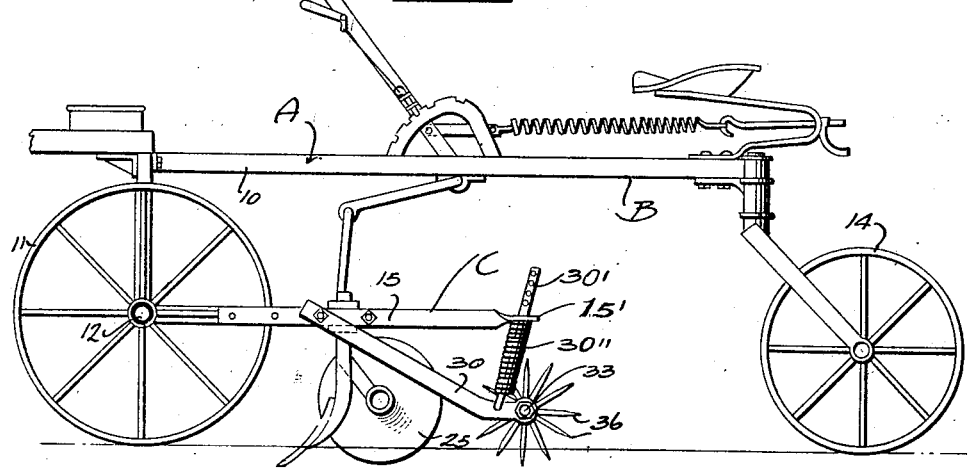
Figure 1 is a side elevation of the improved harrow or cultivator, of substantially the same type set forth in my copending application, Serial No. 400,976, filed August 3, 1920.

In the drawings, wherein for the purpose of illustration are shown the preferred and modified forms of the invention, the letter A generally may designate a cultivator of any approved type, including the chassis B, and harrow or earth working attachment C.

The chassis B is preferably of any approved construction, including the frame 10, supporting at its forward end the front running gear 11, which includes an axle 12. At its rear end, the frame 10 preferably is provided with running gear 14 of any approved type.

Figure 2:
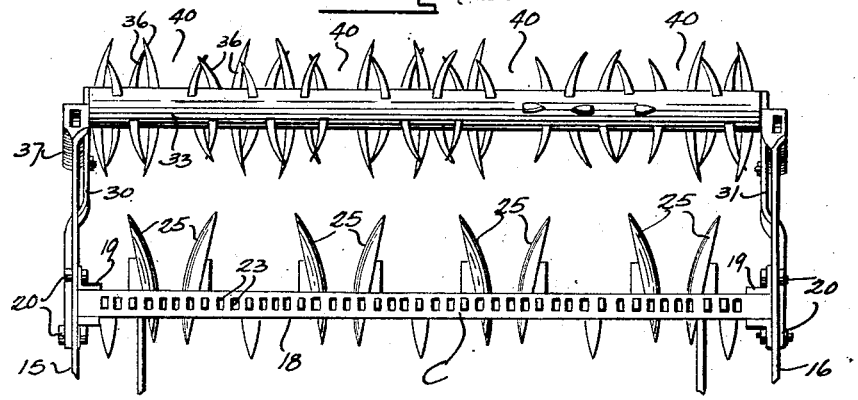
Figure 2 is a plan view of the earth working arrangement of the improved harrow attachment.
Figure 3:
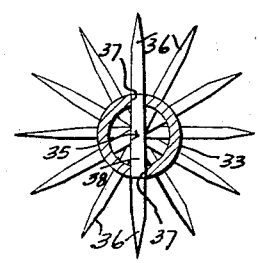
Figure 3 is a cross sectional view, taken transversely through a harrow supporting beam, showing particularly the manner in which teeth are supported thereby.
Figure 6:
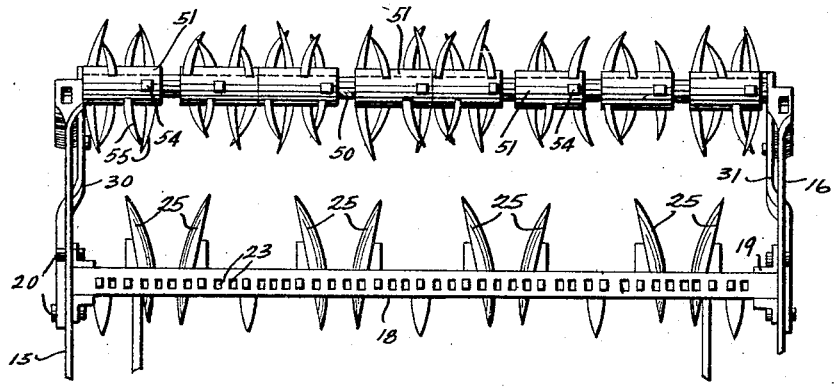
Figure 6 is a plan view, showing a modified form of harrow attachment for cultivators.

The attachment C may generally follow the type described in my copending application above referred to, and may include the side beams 15 and 16, which are pivotally connected at their forward ends to the spindle ends of the axle 12, as to permit vertical movement of said beams. Intermediate their ends, said beams 15 and 16 transversely support a plow beam 18, as by socket members 19, which are secured as by bolts 20 to the inside surfaces of said beams 15 and 16. This beam 18 may be of any approved type, and preferably includes a plurality of openings 23 therein adapted to receive the supporting structures of a series of disc plows 25, which are preferably arranged in pairs with the forward ends of each pair most proximately positioned and gradually diverging toward the rear ends of the same; the space intermediate each pair being such as to accommodate the rows of plants therebetween to adjustably work the soil adjacent the plants without injuring the plants themselves. As is illustrated in Figures 2 and 6, it is preferred that four pairs of plows 25 be provided, so that the improved cultivator is adapted for simultaneously working four rows of plants, as can well be understood by those skilled in agricultural pursuits.

The attachment C furthermore includes arms 30 and 31, which are respectively pivoted at their forward ends intermediate the ends of the beams 15 and 16, as by the bolts 20. These pivotal connections of the side arms 30 and 31 may be adjustable along the beams 15 and 16. The lower ends of the arms 30 and 31 rotatably support the cylindrical shaped harrow beam 33, which is preferably hollow. The rear ends of the beams or side members 15 and 16, are preferably in horizontal planes, as at 15', for reciprocably receiving therethrough guide rods 30' which are connected at their opposite ends to the free swinging ends of the harrow arms 30 and 31. About the rods 30', and intermediate the free ends of the side beams 15 and 16 and the side arms 30 and 31, spiral springs 30'' are preferably provided, which are normally under compression to urge the harrow beam 33 so that the teeth thereof engage the ground surface for soil working purposes, as can well be understood.

Referring to the arrangement of teeth supported by the hollow cylindrical harrow beam 33, it is preferred that members 35, of durable metal be provided, having the opposite ends 36 thereof pointed and tapered. The members 35 are adapted for transverse disposition through the beam 33, as through diametrically opposed and aligning openings 37, so that the opposite ends thereof extend in exposed relation at diametrically opposed points on the beam 33. During this assemblage, the member 35 is preferably of straight line formation, and that portion 38 thereof within the beam 33 is preferably straight. After this relation between the member 35 and the beam 33 has been assumed, the person assembling the teeth upon the harrow beam 33 by striking or otherwise imposing a force upon the exposed ends 36 of the member 35 bends the same laterally in arcuation longitudinally of the beam 33. Thus the ends 36 provide opposed teeth for the beam 33, and are for the preferred type of member 35 both arcuated toward the same end of the beam 33, and incident to this lateral arcuation the member 35 will be maintained rigid with the beam 33 and prevented from displacement therefrom.

From the foregoing it can be seen that each member 35 provides, in fact, two teeth. These members 35 are preferably arranged so that the teeth 36 thereof are inclined with their pointed ends extending toward the pointed ends of an adjacent member 35. By this arrangement, the concaved sides of the teeth 36 of each pair of members 35 are in facing relation, and which has been found to be a very effective construction to facilitate the pulverizing and breaking up of clods of earth and the like.

The members 35 are cooperatively placed with respect to the pairs of disc plows 25, between which the rows of plants are received, so that certain spaces 40 are provided intermediate the convexed sides of the teeth 36, between which the rows of plants are received during travel of the cultivator; these spaces 40 of course, aligning with the spaces intermediate the pairs of plow discs 25, substantially as is illustrated in Figures 2 and 6 of the drawings. The teeth 36 of the members 35 may be arranged substantially in spiral formation around the cylindrical beam or shaft 33.

Figures 4, 5:
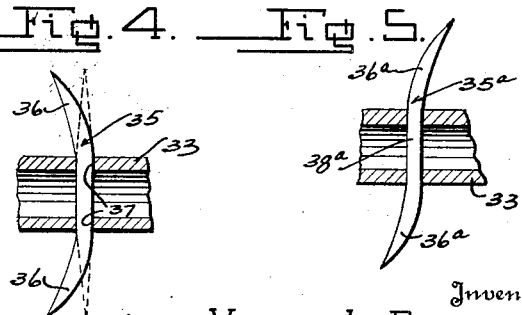
Figure 4 is a fragmentary cross sectional view, taken longitudinally of the beam illustrated in Figure 3, and showing the preferred type of tooth construction for the harrow.
Figure 5 is a fragmentary cross sectional view, showing a modified form of tooth construction.

As illustrated in Figure 5, a modified form of tooth member 35$^a$ may be provided, which may be transversely carried by the cylindrical harrow shaft 33; the intermediate portion 38$^a$ thereof being of straight formation, while the pointed ends 36$^a$ which are diametrically exposed at opposed points upon the shaft 33 are pointed and laterally arcuated in opposite directions longitudinally of the shaft 33.

Figure 7:
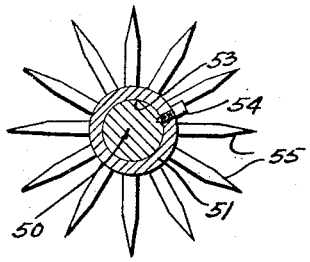
Figure 7 is a cross sectional view, taken transversely of a harrow supporting beam of the type of attachment illustrated in Figure 6.

As illustrated in Figures 6 and 7, the improved harrow attachment may be used with somewhat different arrangement of teeth. This form preferably contemplates the provision of a solid harrow shaft 50, rotatably supported at its ends by the free ends of the attachment frame arms 30 and 31. Sleeves of hollow cylindrical formation are preferably provided, the passageways 53 of which are sufficient to slidably receive the harrow shaft 50, set screws 54 preferably being provided to lock the beams 51 in a desired position longitudinally of the shaft 50. Each of the sleeves 51 preferably receives teeth 55, which may be formed rigid therewith, as by welding. Diametrically opposed teeth 55 are arcuated or bent laterally toward the same end of the sleeve; and it is preferred that the next adjacent and diametrically opposed pair of teeth 55 be laterally inclined toward the opposite end of the sleeve, so that the teeth are substantially in the same overlapping pointed arrangement as above described for the preferred embodiment of this invention. The teeth upon the sleeve of course may be placed in spiral formation.

With the type of harrow illustrated in Figures 6 and 7, the sleeves 51 may be placed at predetermined positions longitudinally of the shaft 50, and maintained in the proper spaced relation to provide spaces between adjacent teeth of adjacent sleeves which cooperate with the spaces intermediate the pairs of disc plows 25, to receive the rows of plants therebetween. It is obvious from this construction that by longitudinal shifting of the sleeves 25, the spaces intermediate the adjacent teeth of adjacent sleeves may be varied, as may also the space intermediate the pairs of plows 25, so that plants of various character, and rows of various widths may be accommodated by the harrow attachment.

From the foregoing description of this invention, it is apparent that an improved cultivator device has been provided, the plow and harrow features of which are cooperative, and the novel teeth construction of the harrow feature providing a simple, durable, and efficient working arrangement.

Various changes in the shape, size and arrangement of parts may be made to the form of invention herein shown and described, without departing from the spirit of this invention or scope of the claims.

I claim:

1. In a device of the class described, the combination of a shaft, members transversely carried by said shaft so that opposite ends thereof extend from said shaft to provide teeth, said teeth being arranged in pairs curved longitudinally of said shaft toward each other and extending in overlapping relation to each other, certain spaces being provided upon said shaft for the reception of rows of plants therebetween as the harrow moves over land, the teeth being so related to said spaces as to have convex sides thereof facing the same.

2. In a device of the class described, the combination of a shaft, teeth extending radially of said shaft and arranged in pairs and curved longitudinally of said shaft towards each other and extending in overlapping relation to each other, spaces being provided along the shaft between certain of said pairs of teeth for the reception of rows of plants, the teeth being so related to the spaces as to have convex sides facing the spaces.

VERNE L. BRANSON.